April 15, 1924.
C. C. FARMER
SAFETY CAR BRAKE
Filed Feb. 17, 1922
1,490,097
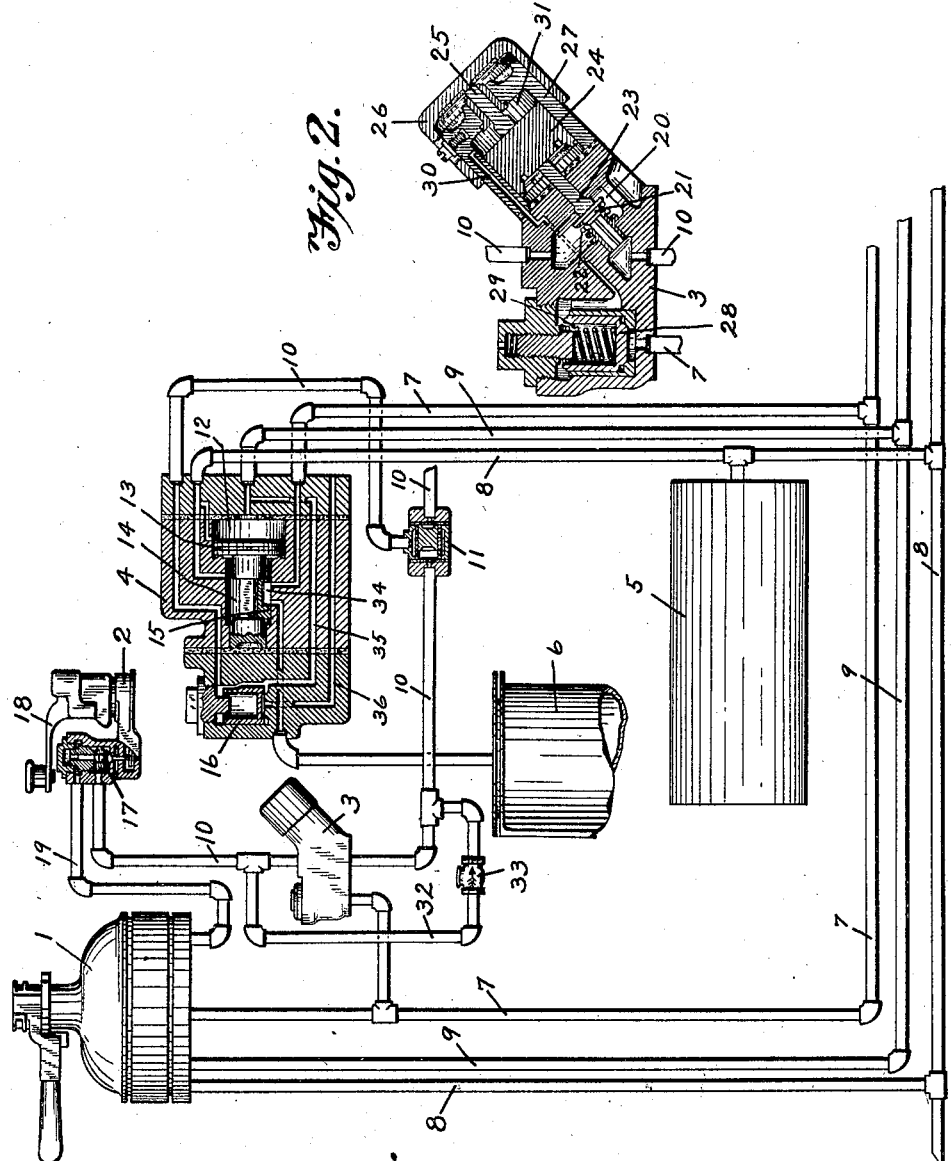
INVENTOR
CLYDE C FARMER
BY *Wm. M. Cady*
ATTORNEY Patented Apr. 15, 1924.

1,490,097

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR BRAKE.

Application filed February 17, 1922. Serial No. 537,248.

*To all whom it may concern:*

Be it known that I, CLYDE C. FARMER, a citizen of the United States, residing at Pittsburgh, in the county of Allegheny and State of Pennsylvania, have invented new and useful Improvements in Safety Car Brakes, of which the following is a specification.

This invention relates to safety car control equipments of the type applied to traction cars to enable one man to control a car.

The principal object of my invention is to provide means for preventing undesired action of the safety features in changing ends on the car.

Other objects and advantages will appear in the following more detailed description of the invention.

In the accompanying drawing; Fig. 1 is a diagrammatic view of a safety car control equipment embodying my invention; and Fig. 2 a sectional view of the foot operated controlling device.

The equipment shown in Fig. 1 is a safety car control equipment of the double end type having at each end of the car a brake valve device 1, a safety control handle device 2, and a foot valve device 3, the above parts, however, being shown in the drawing only at one end of the car, in order to avoid unnecessary duplication.

The safety car equipment also includes an emergency valve device 4, a main reservoir 5, and a brake cylinder 6, with the usual straight air pipe 7, main reservoir pipe 8, brake pipe 9, and a safety control pipe 10, containing a double check valve device 11.

The emergency valve device 4 may comprise a casing having a piston chamber 12 connected to brake pipe 9 and containing a piston 13 and having a valve chamber 14, connected to main reservoir pipe 8 and containing slide valve 15 adapted to be operated by piston 13. A relay valve device 16 is mounted in the casing of the emergency valve device and has one side connected to the safety control pipe 10. The safety controller handle device 2 may comprise a double beat pilot valve 17 adapted, when the hand is removed from the controller handle 18, to connect the safety control pipe 10 with the atmosphere and when the handle 18 is held depressed to connect the pipe 10 with a pipe 19 leading to the brake valve device 1 and through which fluid under pressure is supplied to the safety control pipe.

The foot valve device 3 may comprise a casing having a valve chamber 20 containing a valve 21 for controlling communication through the safety control pipe 10 and normally held open by a spring 22. The closing of the valve 21 is effected through a stem 23 which engages a piston 24 and said piston is operated by a stem 25 which engages a foot piece 26, the foot piece being preferably cup shaped to fit over the cylindrical projecting portion 27 of the casing.

Mounted in the foot valve casing is a valve piston 28, subject on one side to the pressure of a spring 29 and operative by straight air pressure supplied through pipe 7, to open communication from the straight air pipe 7, through passage 30 to piston chamber 31.

For establishing communication through pipe 10 around the foot valve device 3, a by-pass pipe 32 is provided, containing a check valve 33 adapted to permit flow in the direction of the double check valve 11.

In operation, at the operating end of the car, when the controller handle 18 is held depressed, fluid under pressure is supplied from the brake valve device 1 through pipe 19 to the safety control pipe 10 and if the foot piece 26 is not held depressed, fluid flows through the safety control pipe 10, past the valve 21 and shifts the double check valve 11, so that the safety control pipe section leading to the non-operating end of the car is cut off and fluid is supplied from the operating end, past the double check valve to the top of the relay valve 16, holding the same seated.

When the brake valve 1 at the operating end is moved to straight air application position, preparatory to leaving that end of the car, fluid is supplied to the straight air pipe 7 and flows through the exhaust cavity 34 of the emergency slide valve 15 to the brake cylinder 6. Fluid also flows through the straight air pipe 7 to the seated area of the valve piston 28 and when the straight air pressure has been increased to a predetermined degree, the valve piston 28 lifts from its seat, and fluid from the straight air pipe is supplied through passage 30 to piston chamber 31. The piston 24 is then operated to close the valve 21 and thereby cut off communication through the safety control pipe 10, so that the hand may now be removed from the controller handle 18, without causing operation of the safety control, it being understood that normally, as in previous safety control equipments, when the controller handle 18 is released, the pivot valve 17 is operated to vent fluid from the safety control pipe 10 and thus from the top of the relay valve 16, so that said valve is operated to vent fluid from the brake pipe 9 through passage 35 to exhaust port 36 and thereby the emergency piston 13 is operated to shift the slide valve 15, so that fluid is supplied from the valve chamber 14 and the main reservoir to the brake cylinder to effect an emergency application of the brakes.

When the piston 24 of the foot valve device is operated by straight air pressure at the operating end of the car to cut off communication through the safety control pipe, the piston 24 at the non-operating end is also operated in the same way and when the operator goes to the other end of the car, he moves the brake valve handle to release position to effect the release of the brakes.

Fluid is also supplied through the brake valve device to the safety control pipe 10 and this is intended to shift the double check valve 11 so as to open communication from the new operating end through the control pipe to the relay valve 16, while closing communication to the safety control pipe leading to the new non-operating end, but it may sometimes occur that due to slow release action of the piston 24, the valve 21 may not unseat and the double check valve 11 may not be supplied with fluid pressure sufficient to shift same before the valve 21 at the non-operating end has opened slightly. Should this happen, fluid may be vented from the top of the relay valve 16 through the safety control pipe leading to the non-operating end and past the open pilot valve 17 at that end, since the controller handle at the non-operating end is, of course, not depressed, and then an emergency application of the brakes may be caused when not desired.

In order to overcome this difficulty, the by-pass pipe 32 having the non-return check valve 33 is provided, so that when fluid under pressure is supplied from the brake valve to the safety control pipe, the fluid pressure can freely pass through the by-pass pipe 32 around the foot valve device 3, regardless of whether the valve 21 is opened or not and thus the double check valve 11 is promptly shifted so as to cut off communication from the safety control pipe, connected with the non-operating end of the car, to the relay valve 16.

Having now described my invention, what I claim as new and desire to secure by Letters Patent, is:—

1. In a safety car control equipment, the combination with a safety control pipe, a variation in fluid pressure in which is adapted to effect an application of the brakes, of means for controlling communication through said pipe and a by-pass connection around said means for controlling the fluid pressure in said pipe.

2. In a safety car control equipment, the combination with a safety control pipe, a reduction in pressure in which is adapted to effect an application of the brakes, of means for controlling communication through said pipe and a by-pass connection around said means through which fluid under pressure may be supplied to said pipe.

3. In a safety car control equipment, the combination with a safety control pipe, a reduction in pressure in which is adapted to effect an application of the brakes, of means for controlling communication through said pipe, a by-pass connection around said means through which fluid under pressure may be supplied to said pipe, and a check valve in said by-pass.

4. In a safety car control equipment, the combination with a safety control pipe and a relay valve operated upon a reduction in pressure in said pipe for effecting an application of the brakes, of a valve for cutting off communication through said pipe and a by-pass around said valve through which fluid under pressure may be supplied to said pipe.

5. In a safety car control equipment, the combination with a safety control pipe, a relay valve operated upon a reduction in pressure in said pipe for effecting an application of the brakes, and a straight air pipe, of a valve device operated by fluid from the straight air pipe for cutting off communication through the safety control pipe, and a by-pass connection around said valve device through which fluid under pressure may be supplied to said pipe.

6. In a safety car control equipment, the combination with a safety control pipe, a relay valve operated upon a reduction in pressure in said pipe for effecting an application of the brakes, a pilot valve for venting fluid from said pipe, and a straight air pipe, of a valve device operated by fluid from the straight air pipe for cutting off communication through the safety control pipe from the relay valve to the pilot valve and a by-pass connection around said valve device through which fluid under pressure may be supplied to said safety control pipe and the relay valve.

7. In a safety control equipment, the combination with a safety control pipe, a reduction in pressure in which is adapted to effect an application of the brakes and a straight air pipe, of a valve for controlling communication through the safety control pipe, a piston operated by straight air pressure for actuating said valve, and a foot operated member for mechanically operating said piston.

8. In a safety control equipment, the combination with a safety control pipe, a reduction in pressure in which is adapted to effect an application of the brakes and a straight air pipe, of a valve for controlling communication through the safety control pipe, a piston operated by straight air pressure for actuating said valve, and valve means operated at a predetermined pressure in the straight air pipe for supplying fluid to said piston.

9. In a safety control equipment, the combination with a safety control pipe, a reduction in pressure in which is adapted to effect an application of the brakes and a straight air pipe, of a valve for controlling communication through the safety control pipe, a piston operated by straight air pressure for actuating said valve, valve means operated at a predetermined pressure in the straight air pipe for supplying fluid to said piston, and a foot operable member for mechanically actuating said piston.

10. In a safety car control equipment, the combination with a relay valve operable upon a reduction in fluid pressure for effecting an application of the brakes, of a pipe leading to each end of the car through which the fluid pressure on said relay valve may be reduced and a double check valve device for controlling communication from said relay valve to said pipes.

In testimony whereof I have hereunto set my hand.

CLYDE C. FARMER.